United States Patent Office 3,033,809
Patented May 8, 1962

3,033,809
ANTI-FOULING PROTECTIVE COATING COMPOSITIONS
John R. Saroyan, 1320 Carl Ave., Vallejo, Calif., and Hing D. Dear, 535 Grant Ave., San Francisco, Calif.
No Drawing. Filed Jan. 29, 1960, Ser. No. 5,566
7 Claims. (Cl. 260—27)
(Granted under Title 35, U.S. Code (1952), sec. 266)

The invention described herein may be manufactured and used by or for the Government of the United States of America for governmental purposes without the payment of any royalties thereon or therefor.

The present invention relates to a coating composition and more particularly to an anti-fouling protective coating composition.

The present invention is directed to the production of an improved anti-fouling paint which, in addition to meeting better the broad application of anti-fouling paints, has a superior capability for meeting the more stringent requirements of an anti-fouling composition to be used on rubber sonar domes. Such a composition for rubber sonar domes is required, in addition to its anti-fouling property, to provide high degrees of flexibility, adherence and durability and sufficient sound-transparency. Outstanding in the present composition are the high degree of flexibility of and the high concentration of toxicity in the resulting film. The best previously-available anti-fouling composition for such surfaces was Navy Standard 15 NRL whose principal ingredients comprised a combination of elastomer, mercurous chloride, copper resinate, titanium dioxide and diatomaceous silica; this composition has certain disadvantages among which are that it is deficient in anti-fouling properties and is difficult to control, being susceptible to hard pigment settling.

The fundamental concept of the present invention is portrayed by the mixture of copper pigment with high polymer polyisobutylene elastomer and a cyclic acid. Composition grounded on these ingredients shows exemplary flexibility and adhesion on rubber, proper sound-transparency and excellent fouling resistance. The pigment suspension attained is excellent, obviating the difficulty in that regard present with Navy Standard 15 NRL. Like all anti-fouling paints the portraitive composition of copper pigment, cyclic acid and a high molecular weight polyisobutylene elastomer is formulated with a high percentage of the toxic ingredient, i.e., the copper pigment. Since it is well known that copper has a deleterious action on rubber, especially on the type of natural rubber commonly used in sonar equipment, the present invention contemplates the use of suitable primers on the rubber in a paint system wherein the anti-fouling composition is applied over the primer rather than directly to the rubber.

An object of the present invention is the provision of an improved anti-fouling protective composition.

Another object is to provide an anti-fouling protective composition suitable for application on rubber surfaces.

A further object is the provision of an anti-fouling protective composition suitable for application on sonar domes.

An additional object is the provision of an anti-fouling protective composition suitable for application on rubber sonar domes.

Still another object is to provide primers suitably augmenting the anti-fouling composition in a paint system.

Another object is to provide primers suitably augmenting the anti-fouling composition in a paint system applicable to rubber surfaces.

A further object is to provide primers suitably augmenting the anti-fouling composition in a paint system applicable to rubber sonar domes.

Other objects and many of the attendant advantages of this invention will be readily appreciated as the same becomes better understood by reference to the following detailed description.

The crux of this invention is portrayed below by a composition formulated with copper pigment, rosin (a cyclic acid) and a high molecular weight polyisobutylene elastomer known commercially as Vistanex (Enjay Co.). It has been found that different grades of Vistanex can be employed with very little difference in the final properties of the composition; Vistanex B-100 is preferred, but Vistanex B-80 and B-120 yield excellent results.

Table I below represents various "formulations" made to explore the effects of various proportions of Vistanex, copper pigment, rosin and paint thinner:

Table I

[Ingredients in pounds/100 gals. paint]

| Formula No. | Pyro [1] $Cu_2O$ | Elec. [2] $Cu_2O$ | Cement [3] copper | Vistanex B-100 | Rosin | P. thinner |
|---|---|---|---|---|---|---|
| 1 | 854 | | | 29.2 | 156.2 | 413 |
| 2 | 678 | | | 34.8 | 110.3 | 466 |
| 3 | 562 | | | 38.5 | 80.0 | 502 |
| 4 | 480 | | | 41.1 | 58.6 | 526 |
| 5 | 419 | | | 43.1 | 42.6 | 545 |
| 6 | 372 | | | 44.5 | 30.2 | 559 |
| 7 | 1,169 | | | 30.0 | 106.9 | 406 |
| 8 | 923 | | | 35.6 | 70.4 | 462 |
| 9 | 763 | | | 39.2 | 46.5 | 499 |
| 10 | 650 | | | 41.7 | 29.7 | 524 |
| 11 | 566 | | | 43.6 | 17.3 | 544 |
| 12 | 1,501 | | | 30.8 | 54.9 | 399 |
| 13 | 1,180 | | | 36.3 | 28.8 | 458 |
| 14 | 970 | | | 39.9 | 11.8 | 496 |
| 15 | 825 | | | 42.4 | 0 | 522 |
| 16 | 1,733 | | | 31.4 | 18.7 | 394 |
| 17 | 1,355 | | | 36.9 | 0 | 455 |
| 3A | | 539 | | 38.5 | 80.0 | 502 |
| 6A | | 357 | | 44.5 | 30.2 | 559 |
| 8A | | 886 | | 35.6 | 70.4 | 462 |
| 10A | | 623 | | 41.7 | 29.7 | 524 |
| 3B | | | 634 | 38.5 | 80.0 | 502 |
| 6B | | | 419 | 44.5 | 30.2 | 559 |
| 8B | | | 1,041 | 35.6 | 70.4 | 462 |
| 10B | | | 733 | 41.7 | 29.7 | 524 |

[1] Pyrometallurgical cuprous oxide (C. K. Williams Co.).
[2] Electrolytic process cuprous oxide.
[3] Copper-cuprous oxide pigment.

[Calcd. parts by volume in dry film]

| Formula No. | $Cu_2O$ | Vistanex | Rosin |
|---|---|---|---|
| 1 | 45 | 10 | 45 |
| 2 | 45 | 15 | 40 |
| 3 | 45 | 20 | 35 |
| 4 | 45 | 25 | 30 |
| 5 | 45 | 30 | 25 |
| 6 | 45 | 35 | 20 |
| 7 | 60 | 10 | 30 |
| 8 | 60 | 15 | 25 |
| 9 | 60 | 20 | 20 |
| 10 | 60 | 25 | 15 |
| 11 | 60 | 30 | 10 |
| 12 | 75 | 10 | 15 |
| 13 | 75 | 15 | 10 |
| 14 | 75 | 20 | 5 |
| 15 | 75 | 25 | 0 |
| 16 | 85 | 10 | 5 |
| 17 | 85 | 15 | 0 |
| 3A | 45 | 20 | 35 |
| 6A | 45 | 35 | 20 |
| 8A | 60 | 15 | 25 |
| 10A | 60 | 25 | 15 |
| 3B | 45 | 20 | 35 |
| 6B | 45 | 35 | 20 |
| 8B | 60 | 15 | 25 |
| 10B | 60 | 25 | 15 |

NOTE.—All paints contain from .06 to .09 lb. Deenax stabilizer (Enjay Co.; di-ter-butyl P cresol).

In addition to cuprous oxide and metallic copper pigment other compounds which can provide the toxicity which gives the composition its anti-fouling property are suitable ingredients for this composition. Typical of these are certain mercury compounds, such as mercuric oxide and mercurous chloride, for example.

Table II below is a summary of test results of these various formulations and of comparative test results of Navy Standard 15 NRL.

Table II
SUMMARY OF RESULTS OF TEST ON POLYISOBUTYLENE A.F. PAINTS
[Rating of 1 to 5 (1=best)]

| Paints (Formula No.) | Paint film | Antifouling | Pigment suspension | Distensibility |
|---|---|---|---|---|
| 1 | 1 | 2 | 4 | 5 |
| 2 | 1 | 2 | 4 | 5 |
| 3 | 3 | 3 | 3 | 4 |
| 4 | 4 | 4 | 2 | 2 |
| 5 | 4 | 4 | 1 | 1 |
| 6 | 4 | 3 | 1 | 1 |
| 7 | 2 | 2 | 4 | 5 |
| 8 | 1 | 1 | 4 | 5 |
| 9 | 1 | 1 | 3 | 2 |
| 10 | 1 | 2 | 2 | 2 |
| 11 | 2 | 2 | 1 | 2 |
| 12 | 2 | 2 | 4 | 5 |
| 13 | 1 | 1 | 5 | 4 |
| 14 | 1 | 1 | 4 | 3 |
| 15 | 1 | 1 | 5 | 3 |
| 16 | 1 | 2 | 5 | 3 |
| 17 | 1 | 1 | 4 | 3 |
| 15NRL | 5 | 5 | 5 | 5 |
| 3A | 1 | 2 | 1 | 4 |
| 6A | 1 | 3 | 1 | 2 |
| 8A | 1 | 2 | 1 | 5 |
| 10A | 1 | 2 | 1 | 4 |
| 3B | 1 | 2 | 5 | 2 |
| 6B | 1 | 3 | 5 | 1 |
| 8B | 1 | 2 | 5 | 2 |
| 10B | 1 | 2 | 5 | 2 |
| 3–80 [1] | 1 | 1 | 4 | 1 |
| 8–80 | | | 4 | 4 |
| 10–80 | 1 | 2 | 5 | 2 |
| 13–80 | 1 | | 5 | 3 |
| 3–120 [2] | 1 | 2 | 3 | 1 |
| 8–120 | | | 3 | 2 |
| 10–120 | 2 | 2 | 3 | 2 |
| 13–120 | | | 5 | 3 |

[1] 3–80 represents Formula #3 using Vistanex B–80 instead of B–100. Like variation of the various Formulas 8, 10, and 13 follows.
[2] 3–120 represents Formula #3 using Vistanex B–120 instead of B–100. Like variation of the various Formulas 8, 10, and 13 follows.

Table III below is an analysis of the distensibility characteristics of the different formulations:

Table III
DISTENSIBILITY OF POLYISOBUTYLENE ANTIFOULING PAINTS

| Formula No. | Percent distension | Paint film | Surface of paint |
|---|---|---|---|
| 1 | 0.5 | Cracking | |
| 2 | 1 | do | |
| 3 | 2 | Fine cracking | |
| 4 | 16 | | Crazing. |
| 5 | 22 | | No change. |
| 6 | 33 | | Do. |
| 7 | 2 | Cracking | |
| 8 | 1.5 | do | |
| 9 | 12 | | Crazing. |
| 10 | 10–15 | | Do. |
| 11 | 9 | | Do. |
| 12 | 0.5 | Cracking | |
| 13 | 1 | Fine cracking | |
| 14 | 29 | do | Do. |
| 15 | 22 | do | Do. |
| 16 | 1 | Cracking | |
| 17 | 8 | Fine cracking | |
| 3A | 1.5 | do | |
| 6A | 10 | | Do. |
| 8A | 0.5 | Cracking | |
| 10A | 1.5 | Fine cracking | |
| 3B | 20 | | Do. |
| 6B | 28 | | No change. |
| 8B | 27 | | Crazing. |
| 10B | 23 | | Do. |
| 3–80 [1] | 20 | | No change. |
| 8–80 | 3 | Fine cracking | |
| 10–80 | 21 | | Crazing. |
| 13–80 | 10 | Fine cracking | |
| 3–120 [2] | 25 | | No change. |
| 8–120 | 26 | | Crazing. |
| 10–120 | 33 | | Do. |
| 13–120 | 20 | Fine cracking | |

[1] 3–80 represents Formula #3 using Vistanex B–80 instead of B–100. Like variation of the various Formulas 8, 10, and 13 follows.
[2] 3–120 represents Formula #3 using Vistanex B–120 instead of B–100. Like variation of the various Formulas 8, 10, and 13 follows.

Table IV below is an analysis of the pigment sedimentation characteristics of these different formulations:

Table IV
PIGMENT SEDIMENT IN POLYISOBUTYLENE ANTIFOULING PAINTS
PAINTS STORED IN QUART CANS FOR TWENTY MONTHS

| Formula No. | Firmness of sediment | Thickness of sediment, cm. | Instron penetration resistance, lbs. | Redispersion time, minutes | Viscosity, K.U. | Overall rating |
|---|---|---|---|---|---|---|
| 1 | Firm | 2.1 | 33 | 10 | 89 | 4 |
| 2 | do | 1.4 | 18 | 10 | 88 | 4 |
| 3 | do | 1.1 | 7 | 10 | 89 | 3 |
| 4 | Soft | 0.9 | 3 | 5 | 99 | 2 |
| 5 | do | 0.4 | 1 | 0 | 100 | 1 |
| 6 | Very soft | 0.2 | 1 | 0 | 104 | 1 |
| 7 | Firm | 3.3 | 21 | 10 | 100 | 4 |
| 8 | do | 1.3 | 36 | 10 | 101 | 4 |
| 9 | Soft | 1.4 | 8 | 5 | 106 | 3 |
| 10 | do | 1.5 | 3 | 5 | 105 | 2 |
| 11 | Very soft | 0.7 | 2 | 0 | 107 | 1 |
| 12 | Hard | 4.4 | 49 | 10 | 119 | 4 |
| 13 | do | 2.5 | 40 | 15 | 115 | 5 |
| 14 | Firm | 2.3 | 20 | 10 | 111 | 4 |
| 15 | Very hard | 1.4 | >50 | >15 | 113 | 5 |
| 16 | Firm | 4.6 | 30 | 15 | 134 | 5 |
| 17 | Hard | 3.5 | 47 | 10 | 118 | 4 |
| 3A | Very soft | 0.4 | 2 | 0 | 101 | 1 |
| 6A | V. sl. sediment | 0.2 | 0 | 0 | 105 | 1 |
| 8A | Very soft | 0.7 | 2 | 0 | 101 | 1 |
| 10A | do | 0.5 | 1 | 0 | 107 | 1 |
| 3B | Hard | 1.8 | >50 | >15 | 101 | 5 |
| 6B | do | 1.1 | >50 | >15 | 103 | 5 |
| 8B | Very hard | 2.9 | >50 | >15 | 109 | 5 |
| 10B | do | 2.1 | >50 | 10 | 108 | 4 |
| 3–80 [1] | Firm | 1.5 | 27 | 10 | 98 | 4 |
| 8–80 | do | 2.1 | 28 | 10 | 101 | 4 |
| 10–80 | Hard | 1.8 | 37 | >15 | 103 | 5 |
| 13–80 | do | 2.9 | 50 | >15 | 112 | 5 |
| 3–120 [2] | Firm | 1.2 | 13 | 5 | 101 | 3 |
| 8–120 | do | 1.2 | 6 | 10 | 100 | 3 |
| 10–120 | do | 1.4 | 8 | 5 | 108 | 3 |
| 13–120 | Hard | 2.6 | 28 | >15 | 112 | 5 |

[1] 3–80 represents Formula #3 using Vistanex B–80 instead of B–100. Like variation of the various Formulas 8, 10, and 13 follows.
[2] 3–120 represents Formula #3 using Vistanex B–120 instead of B–100. Like variation of the various Formulas 8, 10, and 13 follows.

An analysis of these test results has led to the establishment of the following ranges as yielding satisfactory anti-fouling composition characteristics.

Non-volatile ingredients, percent:
    Cuprous oxide _____ 82–97.5
    Vistanex _____ 1.7–10.5
    Rosin _____ 0–15

Volatile ingredients:
    Paint thinner (solvent) 20–130% of the non-volatile ingredients Percentages are by weight.

Within the scope of broad application, and with particular view toward the use of the anti fouling composition on rubber sonor domes, Formula #10 is considered to have the optimum degree of the sought-for properties of high fouling resistance, flexibility, adherence and durability and adequate sound transparency. In terms of percentages, by weight, Formula #10 is proportioned as follows.

Non-volatile ingredients, percent:
    Cuprous oxide _____ 90
    Vistanex _____ 5.9
    Rosin _____ 4.1

Volatile ingredients:
    Paint thinner (solvent) 73% of the non-volatile ingredients Percentages are by weight.

The improved pigment suspension of the copper pigment-rosin-Vistanex composition obviates the control difficulty incurred with prior anti-fouling compositions such as Navy Standard 15 NRL.

Other solvents may be employed in place of the paint thinner. Typical examples are xylene and mineral spirits.

A recommended formulation procedure is as follows:

Add all the polyisobutylene resin (cut up into small pieces) and any inhibitor employed to nearly all the solvent to form a 7.5% resin solution. Unlike rubber, polyisobutylene resin should not be masticated before preparing the solution, as this causes degradation with resulting deterioration of mechanical properties. If rolls are used to draw the resin out in thin sheets before introduction into the solvent, mastication of the resin should be held to the very least possible amount, and the rolls should be held to about 150–200 degrees centigrade. Solution of the resin is a slow swelling process relatively independent of the rate of agitation. The minimum agitation which prevents settling and compaction of the resin is recommended. The cuprous oxide pigment is mixed with a portion of the 7.5% resin solution to make a mill paste which is then ground on a roller mill. The rosin is dissolved in the rest of the solvent. The mill paste, rosin solution, and rest of the 7.5% resin solution are blended to form the finished paint.

It is a well known fact that copper has a deleterious action on rubber. Accordingly, because of the high copper pigment content of the anti-fouling composition, the invention further contemplates use with the anti-fouling composition, particularly directed to the application of the composition on rubber sonar domes, of supplemental primers. The primers, being applied to the rubber surface first, tend to insulate it from the copper pigment and its deleterious effect thereon.

Illustrative of the paint system incorporating the anti-fouling composition and primers are the following coatings which are applied to the to-be-coated surface in the sequence in which they are below-listed:

(1) One coat MIL-P-5054, clear elastomer paint.
(2) Three coats RP-151, polyisobutylene primer.
(3) Two coats anti-fouling composition, preferably Formula #10.

The first primer (MIL-P-5054) may consist of any elastomer primer suitable for rubber. Examples are "clear elastomer paint" manufactured by Akron Paint and Varnish Company, and Gaco N-29 (neoprene cement) manufactured by Gates Engineering Company. The clear elastomer is a natural rubber solution with a colorless pigment. A variety of natural rubber solutions or cements would be suitable. This first primer as a coating on the rubber also acts to increase the adhesion of the polyisobutylene paints.

The polyisobutylene primer (RP-151) serves as an excellent undercoat since it is flexible, adheres readily to rubber, and has good compatibility with copper-loaded paints. The following is an illustrative example of the composition of this primer.

| Ingredients: | Gallons per 100 gallons |
|---|---|
| Carbon black pigment | 1.90 |
| Polyisobutylene resin, Vistanex B-100 | 4.38 |
| Petroleum spirits (solvent) | 93.72 |
| Inhibitor (Deenax; Enjay Co.) | .004 |

The recommended formulation process for the polyisobutylene primer (RP-151) is as follows:

Add all the polyisobutylene resin (cut up into small pieces) and inhibitor to a portion of the petroleum spirits to form a 7.5% resin solution. Unlike rubber, polyisobutylene resin should not be masticated before preparing the solution, as this causes degradation with resulting deterioration of mechanical properties. If rolls are used to draw the resin out in thin sheets before introduction into the petroleum spirits, mastication of the resin should be held to the very least possible amount. Solution of the resin is a slow swelling process relatively independent of the rate of agitation. The minimum agitation which prevents settling and compaction of the resin is recommended. Charge one-third of the prepared 7.5% resin solution, an equal volume of solvent, and all the lampblack into a steel ball mill. Mill to an eight grind. Blend mill charge with remainder of the 7.5% resin solution and the remainder of the paint thinner to obtain the specification paint. The mill loading may be altered for the purpose of controlling viscosity of mill charge. Grinding equipment other than the ball mill generally yields extremely flocculated products.

In addition to their other characteristics both of the aforementioned primers are sufficiently sound-transparent to supplement the anti-fouling composition in a paint system suitable for use on rubber sonar domes. These paints dry to a dense non-porous coating which readily transmits sound.

The specific formulations for the anti-fouling composition set forth above have included rosin as the cyclic acid ingredient. The ingredient is broadly defined by a cyclic acid capable of exhibiting dissolution in sea water. Within this group cyclic acids of unusually high molecular weight, e.g., 500 or greater, are not practicable because of their excessive dissolution rate in sea water. Suitable cyclic acids, in addition to rosin, are the resinous acids hydrogenated rosin and abietic acid and naphthenic acid (not a resinous acid). When this ingredient is present in zero amount, as in Formula #15, for example, the amount and placement of the toxic element, e.g., copper, is such that there is a continuous contact of toxic particles so that where one is dissipated in the anti-fouling action another is immediately available for reaction with the fouling matter.

The Vistanex in the specific examples portrayed a polyisobutylene polymer with molecular weight of at least 80,000 and in the preferred B-100 had a molecular weight of 100,000.

Obviously many modifications and variations of the present invention are possible in the light of the above teachings. It is therefore to be understood that within the scope of the appended claims the invention may be practiced otherwise than as specifically described.

What is claimed is:

1. An anti-fouling protective coating composition comprising, by weight, non-volatile ingredients comprising from about 82% to about 97.5% cuprous oxide, from about 1.7% to about 10.5% polyisobutylene polymer of molecular weight from about 80,000 to about 120,000, from 0% to about 15% rosin, and volatile ingredients comprising a solvent of from about 20% to about 130% of the non-volatile ingredients.

2. An anti-fouling protective coating composition comprising, by weight, non-volatile ingredients comprising from about 82% to about 97.5% cuprous oxide, from about 1.7% to about 10.5% polyisobutylene polymer of molecular weight of about 100,000, from 0% to about 15% rosin and volatile ingredients comprising a solvent of from about 20% to about 130% of the non-volatile ingredients.

3. An anti-fouling protective coating composition comprising, by weight, non-volatile ingredients comprising from about 82% to about 97.5% cuprous oxide, from about 1.7% to about 10.5% polyisobutylene polymer of molecular weight of about 100,000, from 0% to about 15% rosin and volatile ingredients comprising paint thinner of from about 20% to about 130% of the non-volatile ingredients.

4. An anti-fouling protective coating composition comprising, by weight, non-volatile ingredients comprising about 90% cuprous oxide, about 5.9% polyisobutylene polymer of molecular weight of about 100,000 and about 4.1% rosin and volatile ingredients comprising a solvent in the amount of about 73% of the non-volatile ingredients.

5. An anti-fouling protective coating composition comprising, by weight, non-volatile ingredients comprising 90% cuprous oxide, 5.9% polyisobutylene polymer of molecular weight of 100,000, 4.1% rosin and volatile ingredients comprising a solvent in the amount of 73% of the non-volatile ingredients.

6. A coating composition comprising by weight 3.4% polyisobutylene polymer of molecular weight of 100,000, 42% paint thinner, 2.4% rosin, and 52.2% cuprous oxide.

7. A coating composition comprising, in percentage by volume in the dry film thereof, 60% cuprous oxide, 25% polyisobutylene polymer of molecular weight of 100,000, and 15% rosin.

References Cited in the file of this patent

UNITED STATES PATENTS

| | | |
|---|---|---|
| 2,473,606 | Padowicz | June 21, 1949 |
| 2,579,610 | Pitre | Dec. 25, 1951 |
| 2,592,655 | Carlston et al. | Apr. 15, 1952 |